United States Patent [19]

Longacre, Jr.

[11] Patent Number: 5,233,169
[45] Date of Patent: Aug. 3, 1993

[54] UNIPORT INTERFACE FOR A BAR CODE READING INSTRUMENT

[75] Inventor: Andrew Longacre, Jr., Skaneateles, N.Y.

[73] Assignee: PSC, Inc., Webster, N.Y.

[21] Appl. No.: 785,849

[22] Filed: Oct. 31, 1991

[51] Int. Cl.⁵ .............................................. G06K 7/10
[52] U.S. Cl. ..................................... 235/462; 235/472
[58] Field of Search ....................... 235/462, 470, 472; 250/214 R, 557, 566

[56] References Cited

U.S. PATENT DOCUMENTS

| | | | |
|---|---|---|---|
| 4,721,849 | 1/1988 | Davis et al. | 235/472 |
| 4,945,216 | 7/1990 | Tanabe | 235/462 |
| 4,970,379 | 11/1990 | Danstrom | 235/472 |
| 5,055,660 | 10/1991 | Bertanga et al. | 235/462 |

*Primary Examiner*—John Shepperd
*Assistant Examiner*—K. Shami
*Attorney, Agent, or Firm*—Martin Lu Kacher

[57] ABSTRACT

An optical bar code reading instrument has a uniport interface circuit which accepts through a common terminal both charging current for the reader's internal rechargeable battery and incoming digital electric information signals. The uniport interface also allows digital electrical signals produced by the instrument to pass through the same terminal.

26 Claims, 3 Drawing Sheets

UNIPORT INTERFACE FOR A BAR CODE READING INSTRUMENT

DESCRIPTION

The present invention relates to interface circuits for use in digital bar code readers.

In order to accommodate the input and output of various electrical signals, bar code readers customarily employ a multiplicity of jacks. Each provides for a different jack or connector which provides a receptacle for a plug from a different Input/Output ("I/O") device, such as computers, displays, printers and even other bar code readers. A separate jack and plug is used for a battery charger when the reader is portable and uses a rechargeable battery. A multiplicity of ports present several problems. First, a relatively large amount of space is needed to accommodate all of the jacks, necessarily resulting in larger bar code readers—an undesirable condition for hand-held instruments. Second, separate connecting cables and plugs are needed to carry each signal, which makes the use of a hand-held reader cumbersome. Third, each of a plurality of jacks provides an entrance for the introduction of dirt and other foreign objects into the interior of the reader. To reduce the number of jacks, it has been proposed to provide switches which multiplex the reader to the I/O devices and the battery charger. Circuits for controlling the switches increase the complexity and cost of the bar code reader.

It is the object of this invention to provide connections between an instrument, especially a portable bar code reader or the like, which enables all such connections to be made via a single terminal, as may be provided by a jack.

Another object of the invention is to provide a unitary interface circuit in an instrument such as a bar code reader, which enables the use of a single terminal to provide connections from I/O devices and a battery charger, and which obviates the problems discussed above.

Briefly described, the invention as embodied is an optical bar code reader including an interface circuit internal of the reader connected to the unitary terminal of the reader. The interface circuit includes output means for applying signals generated by the reader to I/O devices external of the reader. The interface also includes input means for operating on digital electrical information signals generated externally of the reader for applying these signals to the reader. Finally, the interface includes battery charging current means for passing current of sufficient magnitude to charge the reader's internal rechargeable battery.

The foregoing, and other objects, features and advantages of the invention, as well as presently preferred embodiments thereof, will become more apparent from a reading of the following description in connection with the accompanying drawings, in which.

Figure 1:
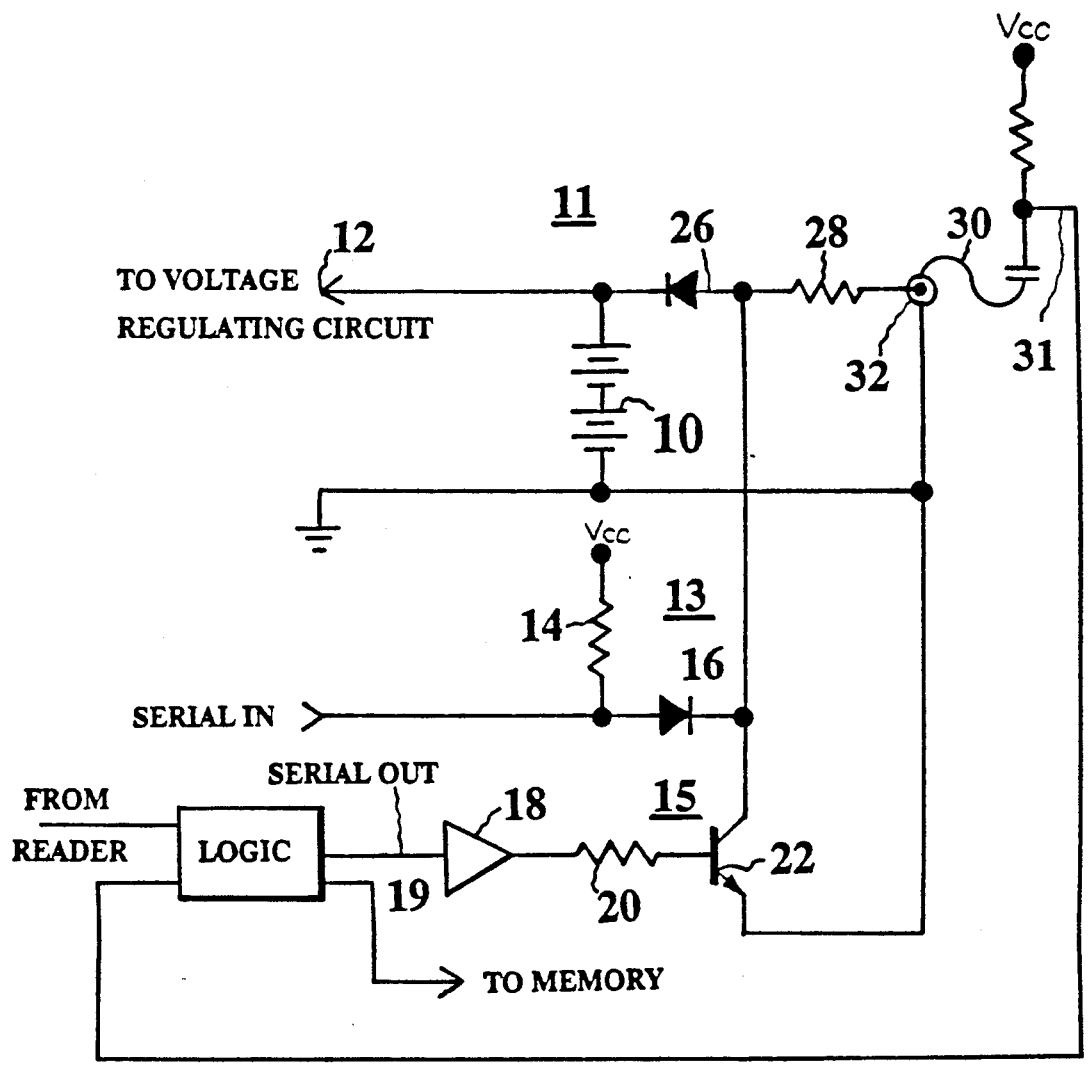
FIG. 1 is a schematic diagram of an interface circuit for a bar code reader having a uniport which provides connections for input and also for output data signals and connections to a source for charging an internal battery in the reader.
Figure 3:
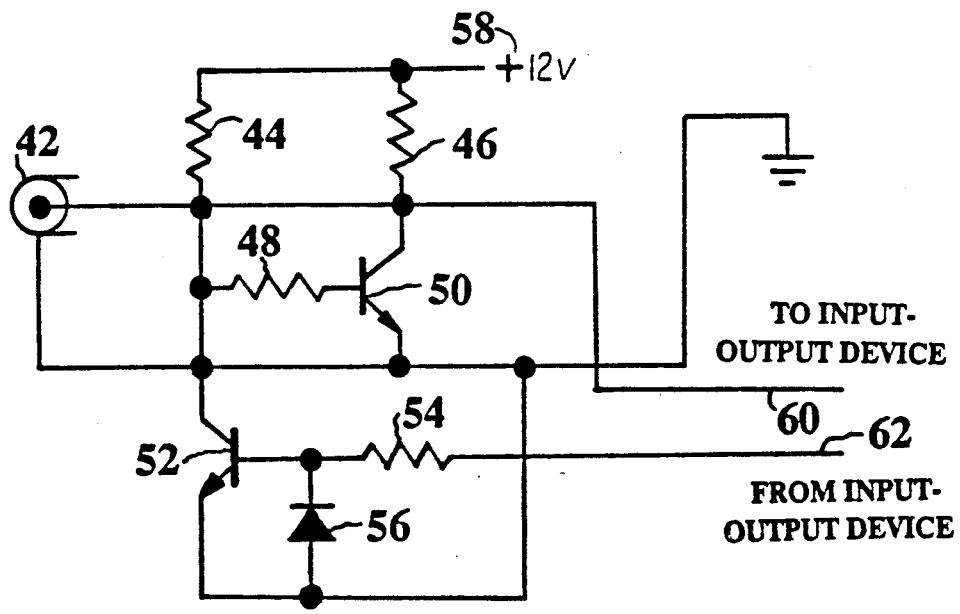
Figure 4:
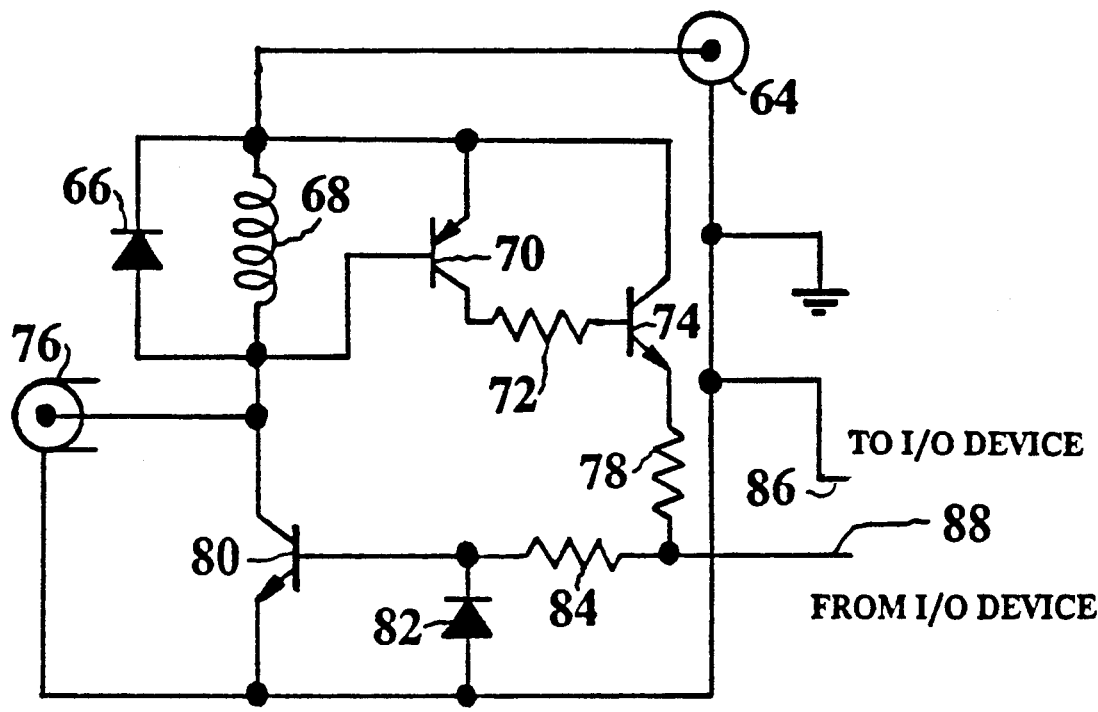

FIG. 3 is a bidirectional adapter circuit, located external to a reader, which is used with the uniport interface circuit of FIG. 1, and which allows both input and output of data signals to be connected to a single terminal of a reader; and FIG. 4 is a combination bidirectional information signal and battery charging current adapter located externally of the reader which is used with the uniport interface circuit of FIG. 1.

Figure 5:
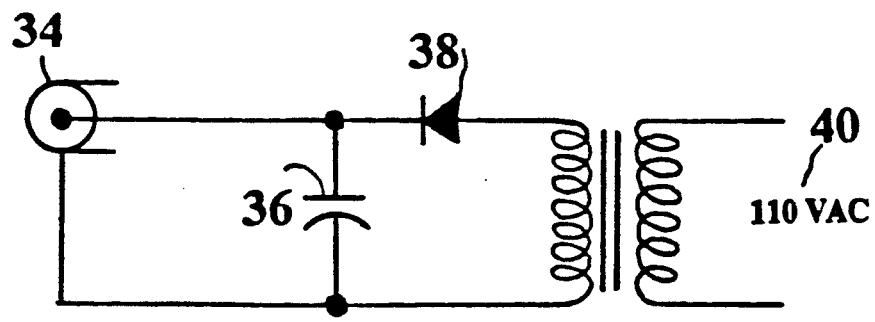

FIG. 5 is a battery charging circuit for use with the reader;

The circuit shown in FIG. 1 is a presently preferred embodiment of the interface circuitry which allows the use of a single terminal to connect I/O devices to a reader. This interface circuitry is referred to as a uniport interface herein. The uniport interface comprises three sections 11, 13, 15, each section performing a different function in the operation thereof.

Figure 2:
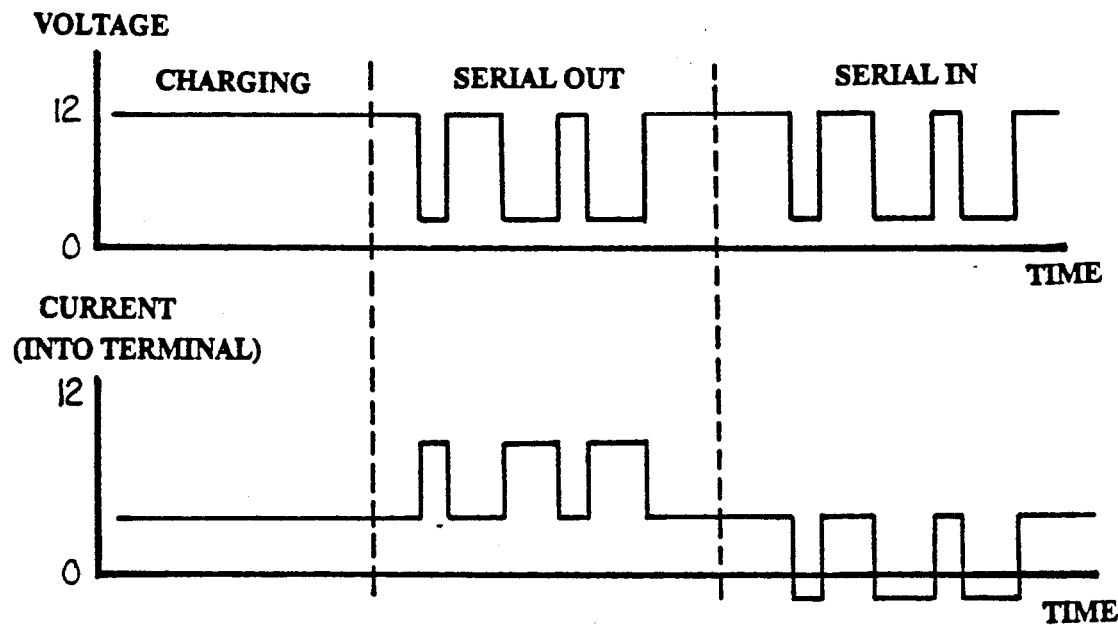
FIG. 2 is a plot displaying the electrical signals provided in operation of the uniport interface circuit.

The upper section 11 of FIG. 1 is the means by which battery charging current is passed through the interface. Diode 26 allows charging current to flow to the reader's internal rechargeable battery 10 from an external power supply while simultaneously preventing the discharge of the battery 10 through the same path. Terminal 12 may be attached to a voltage regulating circuit to ensure that the proper voltage is always provided from the battery 10 to active circuitry in the reader. Resistor 28 limits the flow of current to a desirable rate for charging the internal battery. This shown for "charging" in FIG. 2.

The middle section 13 of FIG. 1 provides means by which electrical signals generated externally of the reader are delivered to the reader. This input circuit allows electrical data signals from an I/O device to flow to the reader via an electrically conductive cable. This capability is useful, for instance, when a multiplicity of scanners are to be synchronized under the same operational scheme. For example, signals describing the number of bar code characters to be recognized and the left or right handedness of the operator can be input to a reader simply by passing those signals through the interface circuit. Reference may be made to my U.S. patent application Ser. No. 07/773,488 for further information concerning a hand-held bar code print quality measuring and display instrument which uses left and right handedness control signals to flip-over its display to accommodate use of the instrument either in the left or right hand of the operator.

In middle section 13, diode 16 causes a low potential to appear at the anode thereof whenever the voltage at the input-output terminal is pulled low. When the potential at terminal 32 is reduced, indicating that information is being sent to the reader, resistor 14 pulls down the serial in 17 potential to a value equal to the sum of the terminal 32 potential and the voltage drop across diode 16. When the potential at the input-output terminal 32 returns to a high level, the potential at the anode of diode 16 likewise is high, that is, the potential at the anode of diode 16 is greater than the potential at terminal 32 by the drop across the diode 16. The operation of the interface's input circuitry is shown in waveforms in FIG. 2 for "serial in" data signals (pulses).

The lower section 15 of FIG. 1 is the signal output circuitry of the interface. When digital electrical information is received by the interface from the reader, the normally high potential at the logic inverter 18 is reduced, resulting in a corresponding rise in the output signal level of logic inverter 18. This is shown for a "serial out" stream of data signal pulses in FIG. 2. Resistor 20 protects transistor 22 by limiting base current flow. The resulting high potential sensed at the base of transistor 22 causes transistor 22 to conduct, allowing current to flow from collector to emitter. The current path from collector to emitter directs the current flowing into the input-output terminal 32 to ground. Consequently, the voltage across input-output terminal 32 is reduced. The duration of the changes in the terminal 32 potential defines the information contained in the reader's output signals.

Switch 30 allows serial out data to be stored internally of the reader in the event that no plug is received in terminal 32. When no plug is received in terminal 32, switch 30 grounds plug detect line 31. This causes a low signal to be detected by the reader's internal plug detect circuitry, and serial out information is stored in the reader's internal memory. When a plug is received in terminal 32, switch 30 opens causing the input to the plug detect circuit to be pulled high, and serial out signals are not stored in the reader's internal memory.

FIG. 3 shows the adapter which is situated externally of the scanner. The purpose of the adapter is to direct various signals to or from the scanner through the uniport interface terminal 32, for application to the uniport interface of the reader.

The DC power shown at 58 (+12 v) for the adapter is supplied by the I/O device. At steady state, that is, when no electrical information signals are being sent to or received from the reader, the voltage across plug 42 is high because of the high impedance of the interface. Thus, the potential at the junction of resistors 44 and 48 will be high. This high potential at the base of transistor 50 causes transistor 50 to conduct current from collector to emitter. The current through the collector and emitter flows to ground. By so conducting, transistor 46 acts to pull down the voltage sensed at the collector of transistor 50, supplying a low voltage signal to the I/O device.

When information is to be output from the reader, the voltage across plug 42 is reduced to a low level. The reduced potential is sensed at the base of transistor 50, and causes transistor 50 to turn off. That is, transistor 50 will no longer conduct from collector to emitter. This results in an increased voltage at the collector of transistor 50 and a consequent higher input potential to the I/O device.

When the signal pulse from the interface returns to its steady state level, transistor 50 again conducts, pulling the collector voltage to its lower, steady state level.

When I/O device signals are to be relayed by the adapter to the reader, the normally low signal level at 62 is raised to a high level. Resistor 54 protects transistor 52 by limiting its base current. This high value is sensed by the base of transistor 52, causing transistor 52 to conduct current from collector to emitter. This path through transistor 52 is connected to ground. The voltage at the collector of transistor 52 is thereby pulled down to a low level with a consequent reduction in voltage across plug 42.

When the voltage at point 62 returns to a low level, the voltage sensed at the base of transistor 52 returns to a low level and transistor 52 turns off. When transistor 52 turns off, the collector emitter junction appears as an open circuit and the adapter returns to steady state.

Diode 56 acts as a snubbing diode to protect transistor 52 in the event that the voltage at point 62 drops to a negative level.

FIG. 4 shows a second adapter which simultaneously directs battery charging and input/output signals to and from the reader. When the adapter operates in its battery charging state, battery charging current from an external battery charging circuit like the one shown in FIG. 5 enters the adapter at plug 64. This charging current flows through inductor 68 to plug 76, and into the battery charging, upper section 11 of the interface circuit of FIG. 1.

When signals are sent from the reader to the I/O device, the voltage at terminal 32 is reduced. This reduces the voltage at plug 76. The reduction in voltage at plug 76 and consequent increased current flow results in current flowing from emitter to base in transistor 70. Transistor 70 then turns on, resulting in current flow between the emitter and collector terminals of transistor 70. This acts to pull up the voltage at the collector of transistor 70 and the base of transistor 74, which turns on transistor 74. Resistor 72 protects transistor 74 from excess current flow. When transistor 74 turns on, current Passes from collector to emitter in transistor 74, resulting in resistor 78 pulling up the voltage at the emitter, and hence point 86. When the voltage across plug 76 returns to a high level, the current flowing through plug 76 is reduced. This reduction in current flow, which cannot instantaneously reduce the rate of current flow through inductor 68, results in reduced current flow from emitter to base in transistor 70. Transistor 70 therefore turns off, returning the base potential of transistor 74 to a low value, which turns transistor 74 off. When transistor 74 is turned off, the potential at point 86 is returned to a low level, and battery charging recommences.

Diode 66 acts as a snubbing diode to limit the base-emitter voltage of transistor 70 in the event that the potential at jack 64 is reduced to a value below the potential at plug 76. Diode 82 acts as a snubbing diode to protect transistor 80 in the event that the voltage at point 88 drops to a negative level.

When data is sent from the I/O device to the reader, the normally low potential at connector 88 increases. This high potential is sensed at the base of transistor 80, causing current to flow from collector to emitter. Because the rate of current flow through inductor 68 cannot change instantaneously, current flow from plug 76 increases. Transistor 80 therefore acts to pull down the potential at plug 76. This low potential at plug 76, and thus at terminal 32, is conveyed as an input signal to the reader. When the potential at point 88 returns to a low value, transistor 80 turns off, and the potential at plug 76 returns to a high value. Battery charging then recommences.

FIG. 5 shows a battery charging circuit which may be used with the uniport interface circuit. The circuit consists of a transformer, the primary 40 of which is supplied with 110 VAC power. The secondary is a half-wave rectification circuit consisting of a diode 38, a capacitor 36 and an output plug 34. The circuit acts to rectify the AC signal induced at the secondary 38 and supply a DC charging signal to the interface.

From the foregoing description it will be apparent that there has been provided an improved interface for bar code reading instruments. While various embodiments of the invention have been described, variations and embodiments thereof within the scope of the invention will undoubtedly suggest themselves to those skilled in the art. Accordingly, the foregoing description should be taken as illustrative and not in a limiting sense.

I claim:

1. In an optical bar code reader in which first digital electrical information signals are generated and which is responsive to second digital electrical information signals generated by a source external of said reader, said reader having an internal battery and an input-output terminal for connecting a source of voltage for charging said battery, the improvement comprising an interface circuit connected to said terminal, said interface circuit including output means for applying said first signals as output signals to said input-output terminal, means connected to said terminal for passing current of sufficient magnitude to charge said battery, and input means operative upon said second digital electrical information signals when said source is connected to said input-output terminal for applying said second digital electrical signals to said reader.

2. The improvement according to claim 1 wherein said charging current passing means comprises a unidirectionally conductive device connected between the input-output terminal and said battery to prevent discharge current from flowing from said battery to said input-output terminal.

3. The improvement according to claim 1 wherein said input means comprises a DC reference voltage source and a unidirectionally conductive device connected between said reference voltage source and said input-output terminal and defining a junction therebetween, said terminal being connected to said junction to provide a path for said second signals into said reader.

4. The improvement according to claim 1 wherein said output means comprises a logic device having means for inverting electrical signals, said logic device having an input and an output, and a transistor having means responsive to said first signals for the operation thereof in a pull down mode, said transistor being connected between said logic device and said input-output terminal with said first signals entering at the input of said logic device.

5. The improvement according to claim 1 wherein said input-output terminal comprises a jack having a receptacle for receiving a plug, said jack having dual contacts and a switch operated by said plug, one of said dual contacts being connected to ground, said switch being in an open state when said jack is in receipt of said plug and in a closed state when said jack is not in receipt of said plug, said reader having a memory, and means for applying said first signals to said memory when said switch is in a closed state.

6. The improvement according to claim 1 wherein said charging current passing means comprises a first unidirectionally conductive device connected between the input-output terminal and said battery to prevent discharge current from flowing from said battery to said input-output terminal, said input means comprises a DC reference voltage and a second unidirectionally conductive device connected between said reference voltage and said input-output terminal, with said second signals being applied to said reader from a point between said reference voltage and said second conductive device, said output means comprises a logic device having means for inverting electrical signals, said logic device having an input and an output, and a transistor with means responsive to said first signals for operation thereof in a pull-down mode, said transistor being connected between said logic device and said input-output terminal with said first signals being applied at the input of said logic device, and wherein said input-output terminal comprises a jack having a receptacle for receiving a plug, said jack having dual contacts and a switch operated by said plug, one of said dual contacts being connected to ground and the other of said contacts being connected to said first unidirectionally conductive device, said switch being in an open state when said jack is in receipt of said plug and in a closed state when said jack is not in receipt of said plug, said reader having a memory, and means for applying said first signals to said memory when said switch is in a closed state.

7. The improvement according to claim 2 wherein said unidirectionally conductive device is a diode having an anode and a cathode, an electrical resistance connected between said input-output terminal and said diode for passing charging current from said source through said diode, and wherein said battery has a positive and a negative terminal, said positive terminal being connected to the cathode of said diode and a voltage regulating means, and said negative terminal being connected to ground.

8. The improvement according to claim 3 wherein an electrical resistance is connected between said source and said unidirectionally conductive device, said device being a diode with an anode and a cathode, the anode of said diode being connected to said resistance and said cathode being connected to said terminal to connect said diode as a reverse biased diode switch, and wherein said input data appear at the cathode of said diode.

9. The improvement according to claim 4 wherein said output means further comprises an electrical resistance, said logic device is a logic inverter, said pull-down transistor is an NPN type transistor having an emitter, a base and a collector, said resistance is connected between said base and the output of said logic inverter, said collector is connected to said input-output terminal, and said emitter is connected to ground, and wherein said first signals are applied to the input of said logic inverter.

10. The improvement according to claim 6 wherein said first device is a first diode having an anode and a cathode, a first resistance is connected between said input-output terminal and said first diode, input electrical charging current from said source to said battery flowing through said first diode and said first resistance, said battery has a positive and a negative terminal, said positive terminal being connected to both the cathode of said first diode and said reader, and said negative terminal being connected to ground, a second electrical resistance is connected between said source and said second unidirectionally conductive device, said second unidirectionally conductive device being a second diode with an anode and a cathode, the cathode of said second diode being connected to both said first resistance and said first diode, the anode of said second diode being connected to said second resistance and said cathode of said second diode being connected to connect said second diode as a reverse biased diode switch, input data signals appear at the cathode of said second diode, said output means further comprises a third electrical resistance, said logic device is a logic inverter, said pull-down transistor is an NPN type transistor having an emitter, a base and a collector, said third resistance is connected between said base and the output of said logic inverter, said collector is connected to the cathode of said second diode, and said emitter is connected to ground, and wherein said first signals are received at the input of said logic inverter.

11. In a bar code reader system having a reader with an internal battery and a single terminal for connecting a source of voltage for charging said battery and for sending first electrical data signals as output signals from said reader and receiving second electrical data signals as input to said reader, said reader having a jack with dual contacts, the improvement comprising an adapter for use as an interface between said reader and an external input-output device, said adapter including output means for applying said first signals from said reader as output signals to said input-output device, input means for applying said second signals from said input-output device as input signals to said reader, and a dual contact plug receivable in said terminal, one contact being common, the other contact being connected to said input and output means.

12. The improvement according to claim 11 wherein said output means comprises a DC power supply, a current limiting resistance connected between said DC power supply and said plug, a transistor with means for operating said transistor in a pull down mode, said transistor having a base, a collector and an emitter connected between said plug, said input-output device and ground, and a voltage pull-down resistance connected between said collector and said power supply, said transistor acting to invert said first signals.

13. The improvement according to claim 11, wherein said input means comprises a transistor with means for operating said transistor in a pull-down mode, said transistor having an emitter, a collector and a base connected between each terminal of said plug and said input-output device.

14. The improvement according to claim 11 wherein said output means comprises a DC power supply, a first current limiting resistance connected between said DC power supply and said plug, a first transistor with means for operating said transistor in a pull down mode, said transistor having a first base, a first collector and a first emitter connected between said plug, said input-output device and ground, and a voltage pull-down resistance connected between said first collector and said power supply, said first transistor acting to invert said first signals, and wherein said input means comprises a second transistor with means for operating said transistor in a pull down mode, said transistor having a second emitter, a second collector and a second base connected between each terminal of said plug and said input-output device.

15. The improvement according to claim 12 wherein said output means also comprises a current limiting resistance between said base and said plug, said current limiting resistance acting as a current limiter for said base.

16. The improvement according to claim 13 wherein said input means also comprises a unidirectionally conductive device connected between said emitter and said base, said unidirectionally conductive device being a diode and acting as a voltage snubber to prevent damage to said transistor, and a current limiting resistance acting to limit the flow of current to said base.

17. The improvement according to claim 14 wherein said output means also comprises a first current limiting resistance between said first base and said plug, said first current limiting resistance acting as a current limiter for said first base, said input means also comprises a unidirectionally conductive device connected between said second emitter and said second base, said unidirectionally conductive device being a diode and acting as a voltage snubber to prevent damage to said second transistor, and a second current limiting resistance acting to limit the flow of current to said second base.

18. In a bar code reader system having a reader with an internal battery and a single terminal for connecting a source of voltage for charging said battery and for sending first electrical data signals as output signals to an input-output device, said first signals being generated in said reader, and receiving second electrical data signals as input from said reader, said second signals being generated in said input-output device, said reader having a jack with dual contacts, the improvement comprising an adapter for use as an interface between said reader and both said voltage source and an external input-output device, said adapter including means for passing current of sufficient magnitude to charge said battery, output means for applying said first signals as output signals to said input-output device, input means in which said second signals are generated in said input-output device for applying said second signals to said reader, and a plug to be received in said terminal.

19. The improvement according to claim 18 wherein said current passing means comprises a power jack, said jack receiving battery charging current from said source, and an inductor connected between said jack and said plug.

20. The improvement according to claim 18 wherein said input means comprises a transistor with means for operating said transistor in a pull-down mode, said transistor having an emitter, a base and a collector connected between ground, said input-output device and both said inductor and said plug.

21. The improvement according to claim 16 wherein said output means comprises a dual stage transistor circuit, said transistor circuit comprising a first transistor and a second transistor, said first transistor being connected between said jack, said plug and said second transistor, said second transistor being connected between said jack, said first transistor and said input-output device.

22. The improvement according to claim 18 wherein said input means comprises a transistor having means for operating said transistor in a pull-down mode, said transistor having an emitter, a base and a collector connected between ground, said input-output device and both said inductor and said plug, and wherein said output means comprises a dual stage transistor circuit, said transistor circuit comprising a first transistor and a second transistor, said first transistor being connected between said jack, said plug and said second transistor, said second transistor being connected between said jack, said first transistor and said input-output device.

23. The improvement according to claim 20 wherein said input means further comprises a current limiting resistance connected between said input-output device and the base of said transistor, and a voltage snubbing diode connected between the base and the emitter of said transistor, said diode preventing damage to said transistor.

24. The improvement according to claim 21 wherein said output means further comprises a snubbing diode connected across said inductor, said snubbing diode preventing excess current from flowing to the base of said first transistor, said first transistor is a PNP type transistor with a first collector, a first base and a first emitter, said second transistor is an NPN type transistor with a second collector, a second base and a second emitter, said first base being connected to each of said diode, said inductor and said plug, said first emitter being connected to each of said inductor, said diode and said jack, said first collector being connected to said second base, said second collector being connected to said first emitter, and said second emitter being connected to said input-output device, and wherein said output means also comprises a base current limiting resistance connected between said first collector and said second base.

25. The improvement according to claim 22 wherein said input means further comprises a first base current limiting resistance connected between said input-output device and the base terminal of said first transistor, and a voltage snubbing diode connected between the base and the emitter of said first transistor, said diode preventing damage to said first transistor, and wherein said output means further comprises a snubbing diode connected across said inductor, said snubbing diode preventing excess current from flowing to the base of said first transistor, said first transistor is a PNP type transistor with a first collector, a first base and a first emitter, said second transistor is an NPN type transistor with a second collector, a second base and a second emitter, said first base being connected to each of said diode, said inductor and said plug, said first emitter being connected to each of said inductor, said diode and said jack, said first collector being connected to said second base, said second collector being connected to said first emitter, and said second emitter being connected to said input-output device, and wherein said output means also comprises a second base current limiting resistance connected between said first collector and said second base.

26. The improvement according to claim 10 wherein said charging voltage is supplied by a battery charging circuit, said charging circuit comprising a transformer with a primary and a secondary winding, a diode and a capacitor, said secondary winding being connected to one end of said diode, the other end of said diode being connected to said plug, and said capacitor connected between said secondary winding and the junction of said diode and said plug.

* * * * *